United States Patent [19]

Kutzli et al.

[11] Patent Number: 4,598,816
[45] Date of Patent: Jul. 8, 1986

[54] METHOD AND MEANS FOR JIGGING WORKPIECE FOR MACHINING

[76] Inventors: Carl R. Kutzli, 2801 Ridge Rd., Highland, Mich. 48031; James D. Rutter, 6615 Fairfield, Garden City, Mich. 48135

[21] Appl. No.: 637,861

[22] Filed: Aug. 6, 1984

[51] Int. Cl.⁴ .................................................. B65G 37/00
[52] U.S. Cl. .............................. 198/465.1; 198/346.1; 198/379
[58] Field of Search ................... 269/56, 69; 217/43 A; 206/386, 595–600; 29/33 P, 563; 198/344, 345, 411, 472, 648, 465.1, 346.1, 379

[56] References Cited

U.S. PATENT DOCUMENTS

| | | | |
|---|---|---|---|
| 2,176,089 | 10/1939 | Malone | 269/287 |
| 2,392,169 | 1/1946 | Mansfield | 29/33 P |
| 2,559,369 | 7/1951 | Phillips | 198/411 |
| 3,148,873 | 9/1964 | Chandler | 269/71 |
| 3,361,033 | 1/1968 | Muller | 409/168 |
| 3,530,571 | 9/1970 | Perry | 198/472 X |
| 3,540,566 | 11/1970 | Perry et al. | 198/344 |
| 3,543,392 | 12/1970 | Perry et al. | 29/563 |
| 3,952,388 | 4/1976 | Hasegawa et al. | 29/33 P |
| 4,014,428 | 3/1977 | Ossbahr | 198/472 X |
| 4,148,400 | 4/1979 | Cross | 198/648 |
| 4,154,330 | 5/1979 | Lucas | 198/411 |
| 4,159,762 | 7/1979 | Bulwith | 198/472 |
| 4,262,891 | 4/1981 | Kinney | 269/71 |
| 4,309,600 | 1/1982 | Perry et al. | 235/375 |
| 4,444,303 | 4/1984 | Burgess, Jr. | 198/472 X |
| 4,492,297 | 1/1985 | Sticht | 198/472 X |
| 4,492,301 | 1/1985 | Inaba et al. | 198/345 X |
| 4,494,282 | 1/1985 | Ida et al. | 198/472 X |
| 4,498,571 | 2/1985 | Nomura et al. | 29/33 P X |

FOREIGN PATENT DOCUMENTS

| | | | |
|---|---|---|---|
| 2487300 | 1/1982 | France | 206/596 |
| 0136946 | 8/1979 | Netherlands | 206/386 |

OTHER PUBLICATIONS

Concept-published by Cincinnati Milacron Company--copyrighted 1979.

Primary Examiner—Joseph E. Valenza
Assistant Examiner—D. Glenn Dayoan
Attorney, Agent, or Firm—Price, Heneveld, Huizenga & Cooper

[57] ABSTRACT

A system is disclosed for machining parts particularly parts having high volume demand, above average accuracy and requiring strict cost control. The system uses a plurality of cubic fixture cages to be conveyed between multiple work stations. At each work station the cubic fixture cage is lifted from the conveyor and indexed with respect to the tools at the work station by lift means in the cell part whereby the initial control is located at the top of the fixture cage, an area free of chips and other debris. The cubic construction for the fixture cage provides a positive, uniform and repeatable tooling index based on the geometric center of the cube, thus permitting the fixture cage to be rotated about both its vertical and horizontal axes utilizing a single, universal tooling reference point.

21 Claims, 22 Drawing Figures

METHOD AND MEANS FOR JIGGING WORKPIECE FOR MACHINING

FIELD OF THE INVENTION

This invention relates to the machining of parts, particularly complex parts requiring multiple, separate machining operations of the type in which the part is held stationary while the tool moves. More particularly, the invention relates to a novel workpiece or part mounting and transporting fixture and to a cell for positioning and holding the fixture at a machine tool location and to a system for the progressive machining of workpieces utilizing the novel fixtures and holding cells.

BACKGROUND OF THE INVENTION

It has long been common practice in the manufacture of mass produced parts such, for example, as carburetor housings, automatic transmission housings, cylinder blocks and the like to mount the part on a pallet, fixture or a jig and while so mounted move the part through a number of work stations. At each work station one or more machining operations are performed and the part is then transported to another work station where additional machining operations are performed. The parts mounted on their pallets, fixtures or jigs are transported from work station to work station on conveyors and remain on the conveyor or a spur track of the conveyor at each work station. This arrangement has a number of drawbacks and limitations.

One of the significant drawbacks is that such systems are static in that they normally have to be substantially or entirely rebuilt to adapt them from a part of one design to a part of another design. In many cases there is little or nothing that can be salvaged from the entire system. Thus, these systems are excessively costly and are limited to use only for parts which are to be mass produced over a substantial period of time.

Another important drawback is that many of these fixtures provide very limited tool access. If the fixture permits machining from more than one face, frequently fixture design does not permit accurate indexing of the part to the tools. In many cases, when the part must be approached for machining from several faces, the part has to be removed from its fixture and remounted on a different fixture. Not only is this procedure time consuming and labor intensive, it also requires the designing, building, testing and maintenance of several fixtures to complete the machining of a single part. Further, of equal if not greater significance, is the fact that the use of multiple fixtures or the like can and does result in an accumulation of tolerances sufficient to render a significant proportion of the resulting parts marginal or scrap. Further, even though the fixtures were initially sufficiently accurate that acceptable parts were originally produced, differentials in rate or wear and other factors can rapidly eliminate this situation.

Another factor adversely affecting the accuracy of many conventional machining systems is the absence of a single, uniform reference or index point capable of accurately positioning the part of all work stations and at all positions in each work station. This is often true in pallet type systems because the pallets lack a uniform reference point common to all the pallets. Another major source of inaccuracies in the finished parts is that resulting from clips and turnings which become lodged between the fixture and its supporting surface, misaligning the part with respect to the tool.

Another factor which contributes to lack of accuracy in conventional pallet type machining systems is that each pallet, fixture or jig normally is custom designed for the part with which it is to be used. This is often true of the several fixtures frequently necessary to machine a single part in free transfer systems. Thus, there is no reference point common to all the fixtures for indexing them to the machine tools which are to work on the part. This has materially handicapped efforts to maintain the accuracy necessary for true interchangeability.

BRIEF DESCRIPTION OF THE INVENTION

The invention employs a cubic fixture cage within which the part is mounted. This fixture cage provides tool access to the part from four, five or even six faces, depending upon the design of the part and the machining required. Being a cube, the fixture has a geometric center which is located the identical distance from each face and each corner, thus, providing a common reference point for locating the part with respect to the fixture and to the tools to be used to machine it. The fixture has external indexing or locating pads machined to a high degree of accuracy whereby the geometric center of the fixture can be located vertically with respect to each of the tools by the work station which holds the fixture during machining. At each work station where machining is to be performed, the fixture cage is entered into a holding cell where it is lifted from the conveyor and its locating pads pressed against matching pads in the cell to position the fixture cage vertically. The cell includes means for rotating the fixture cage in arcs of any length through a full 360° to present different faces of the part or the same face at different angles to the tools so that all machining to be done by the particular tool on a part can be performed on the part while it remains in the work station cell.

When all machining operations are completed which the particular tool can perform by addressing the part from any point around a full 360° about the vertical central axis of the fixture cage, the fixture cage is removed from the cell and either transferred to another station for additional and different machining or it is rotated 90° about its horizontal axis and returned to the cell for additional machining on targets not previously accessible. In this manner all of the machining to be performed on a particular part can be done on the part while it remains clamped in the same position in the same fixture cage throughout the entire procedure.

DESCRIPTION OF THE PREFERRED EMBODIMENT

Figure 1:
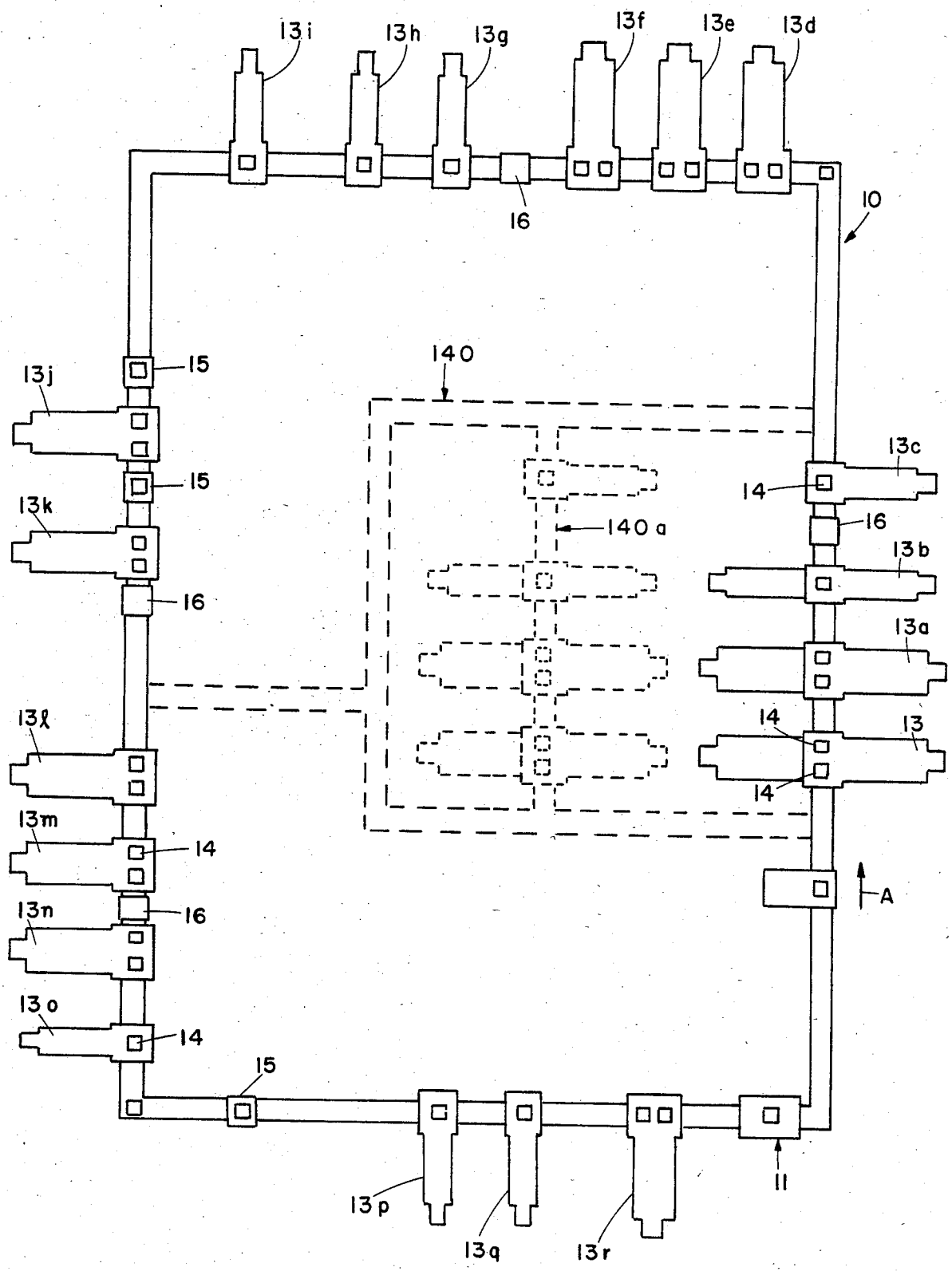
FIG. 1 is a schematic layout of a system for machining parts incorporating this invention.

Referring to FIG. 1 the numeral 10 identifies a closed loop conveyor which at one end passes through a loading and unloading station 11. On the conveyor, parts are transported around the loop while mounted within a fixture cages such, for example, as the fixture cages illustrated in FIGS. 2 and 4. As they travel around the loop they pass through one or more work stations identified by the numerals 13, 13a through 13r. Each of the stations has at least one and others have two fixture holding and positioning cells 14. In the particular arrangement shown, the conveyor 10 passes through each of the cells with the fixture cages travelling in the direction of the arrow A. The cells normally include means for rotating the fixture cages about their vertical axes while the fixture cage remains in the cell. Some cells may not include this feature for one reason or another. When this is true, the rotational facility 15 may be located in the conveyor externally of any cell and may serve several cells. When required, the system incorporates means such as 16 for rotation of the fixture cages about their horizontal axis. This makes it possible to machine targets on the workpiece faces which were formerly on the top or bottom and thus not accessible to the tools through a vertical face. At the end of the circuit part may be removed from the fixture cage or the fixture cage with the part it contains may be removed from the conveyor. The normal procedure with most parts is to substitute parts in the fixture cage while the fixture cage remains on the conveyor at a loading and unloading station. This can be done by the same automated loading and unloading device 11 as was used to load the part of the system originally. The preceding is a simplified arrangement of this invention, the invention being capable of substantially more complex arrangements, as will be explained subsequently.

Figure 2:
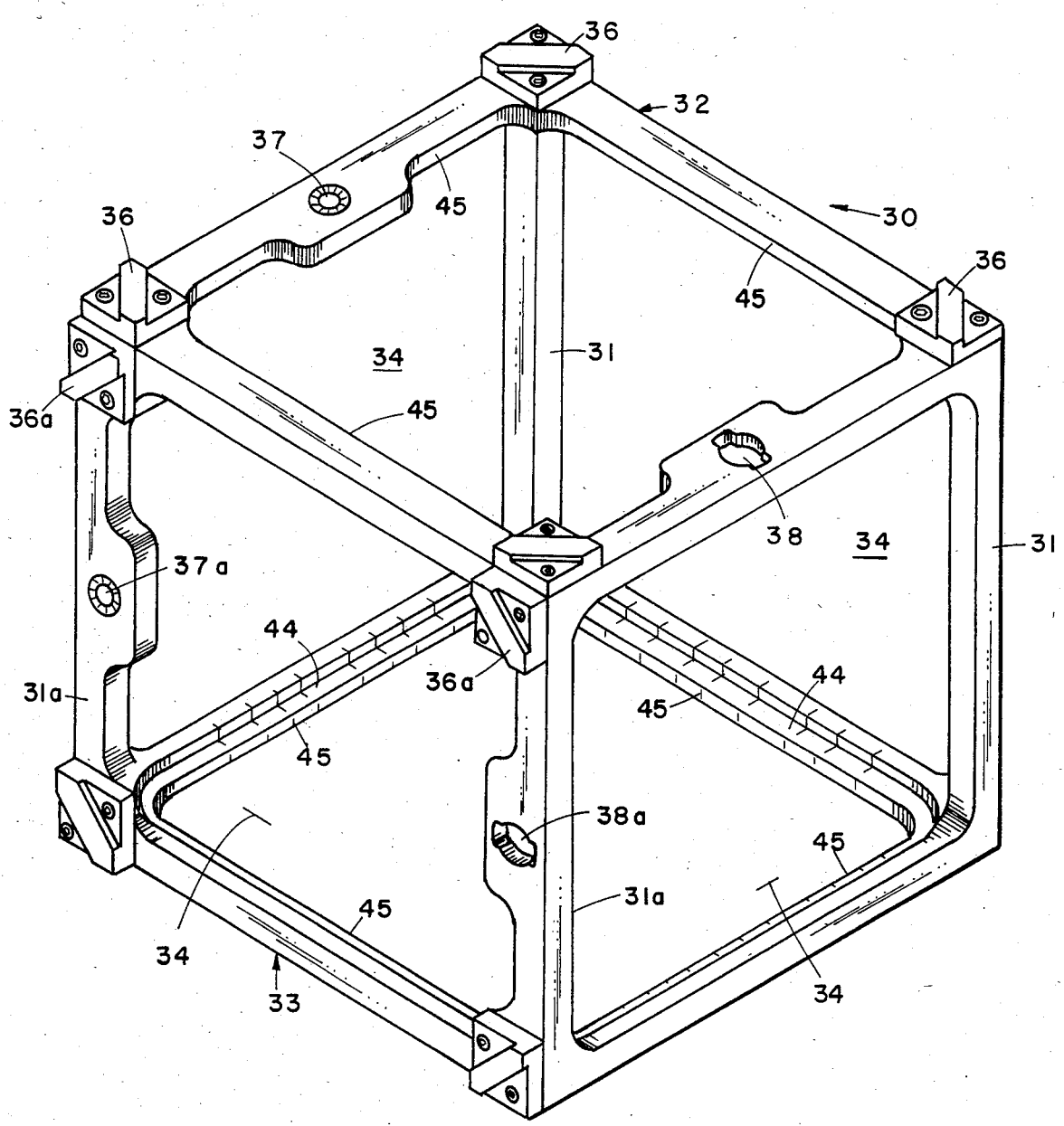
FIG. 2 is an enlarged, oblique view of a fixture cage used in the system.

To realize the potential of a machining system incorporating this invention, it is necessary to use a cubic fixture cage 30 (FIG. 2). The fixture cage is a true cube having two corner posts 31 and two corner posts 31a, a top frame 32 and a bottom frame 33 all welded or bolted together or cast as a single part to form a very rigid, inflexible structure while will not permit a workpiece clamped within it to shift in any direction due to flexure of the fixture cage structure as it is moved through the complex of stations or as a result of pressure exerted by the tools during machining. All four of the side faces are identical, each providing a window 34 occupying almost the entire face or side as an unobstructed, framed, access opening for tools. Preferably, the bottom face is also open and provides a tool access window. Two of the bars 45 forming the top frame 32 have areas of increased flange width to accommodate the locator openings 37 and 38. These openings are centered about a vertical plane passing through the geometric center of the fixture cage. These openings are provided to engage the fixture cage locator pins to be described subsequently and as such it is very important that they be precisely located. At each of the four corners of the top frame 32 locating pads 36 are located. The raised contact surfaces of the locating pads are precisely machined to a very accurate spacing from a horizontal plane parallel to the top of the fixture cage and passing through the geometric center of the fixture cage. These pads control the vertical position of the fixture cage at the machining stations.

Figure 3:
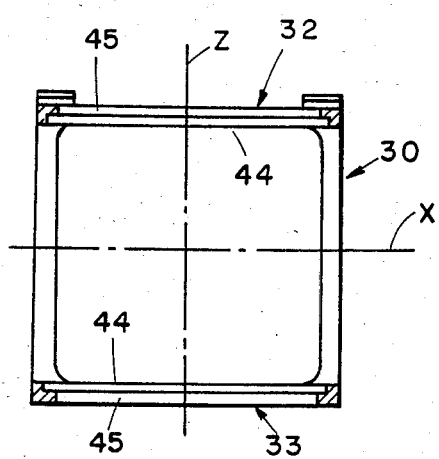
FIG. 3 is a sectional view, on a reduced scale, taken along the plane III—III of FIG. 2.
Figure 5:
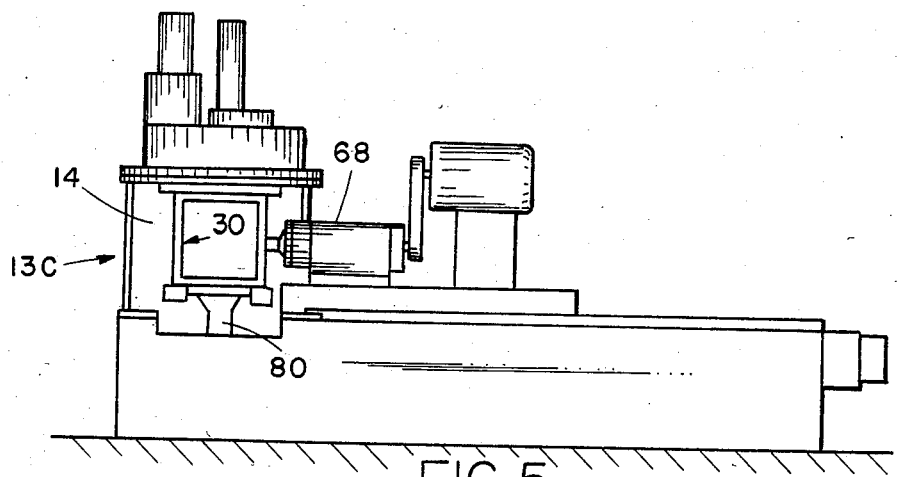
FIG. 5 is a somewhat schematic side view of a work station.

Since it is intended that the fixture cages be capable of being rotated about their horizontal axis X (see FIG. 3) so that the top and bottom faces are reoriented vertically, it is necessary to duplicate the top structural arrangement on one of the side faces. This is done by providing two corner posts 31a with the same areas of increased flange width and locator openings 37a and 38a. Also the four corners of that side are provided with locating pads 36a spaced from a vertical plane parallel to the face of the cage and passing through the X axis a distance identical to the spacing of the indexing pads 36 from a horizontal plane passing through the same axis.

Figure 4:
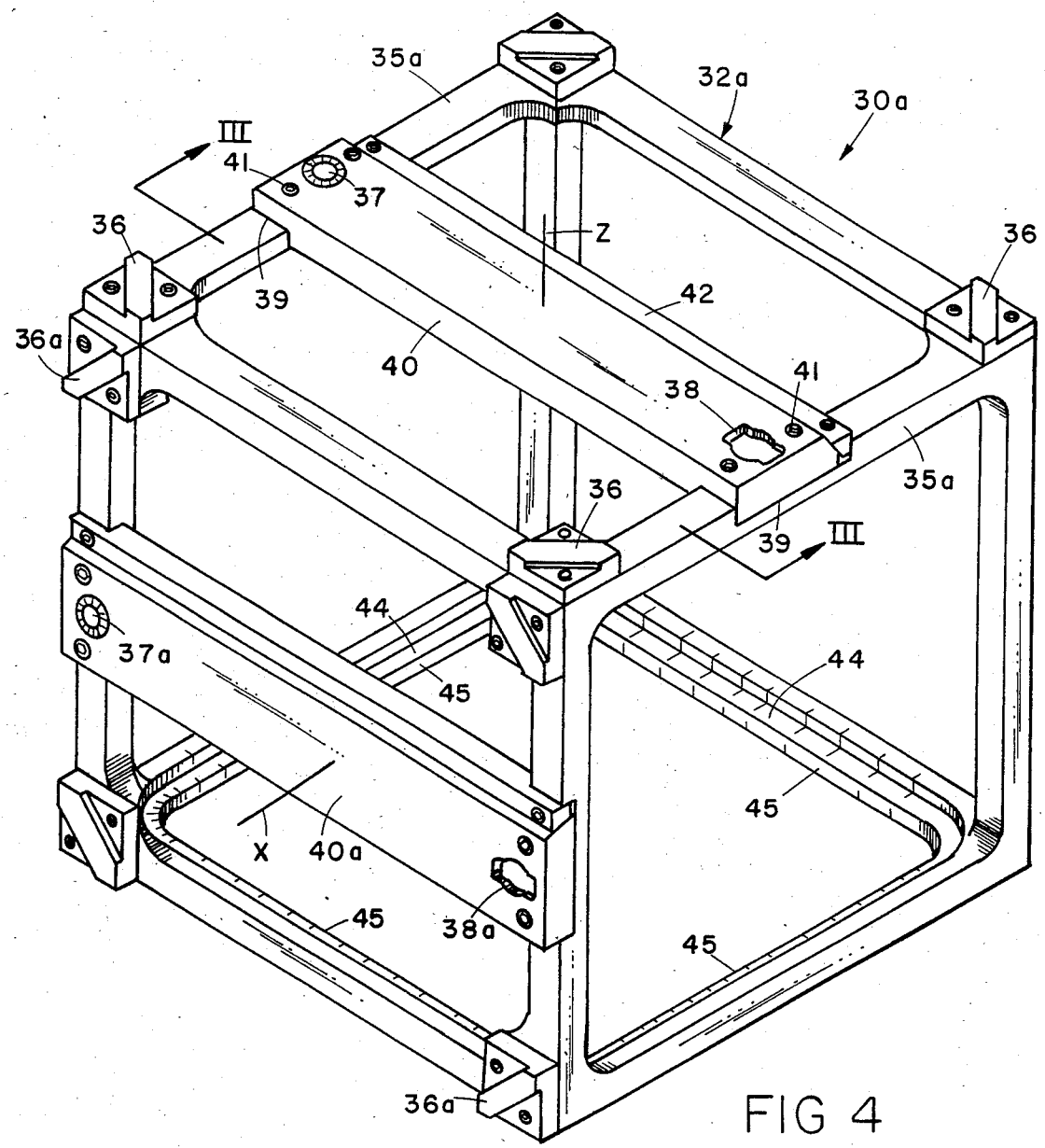
FIG. 4 is an enlarged oblique view of a further modified construction for the fixture cage.

FIG. 4 illustrates a modified construction for the fixture cage 30a. In this construction two sides 35a of the top frame 32a are recessed at 39 to receive a cross bar 40 which incorporates the locator openings 37 and 38. The cross bar is secured by cap screws 41 and wedge-shaped key 42. The four corners of the top frame 32a are provided with locating pads 36. Like the fixture cage 30, the fixture cage 30a is designed to be rotated to position the top and bottom faces in a vertical position. For this purpose a second cross bar 40a is provided across one face and this same face is equipped with locating pads 36a at its four corners. The cross bar 40a is provided with locator openings 37a and 38a.

Figures 11, 12:
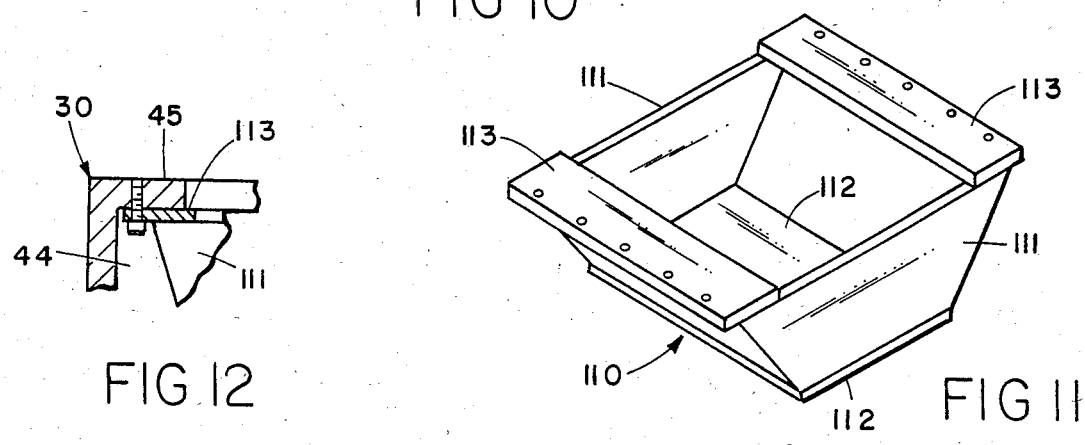
FIG. 11 is an oblique view of a part support base for a fixture cage.
FIG. 12 is a fragmentary sectional view taken along the plane XII—XII of FIG. 15.

The individual frame members of the top and bottom frames 32, 33 and 32a and 33a are L-shaped in cross section providing an internal recess 44 in the top and bottom frames defined by the flange 45 (FIGS. 2, 4 and 12). This recess serves as a means of mounting the workpiece supports which hold the part within the fixture, as will be explained subsequently.

Figure 2A:
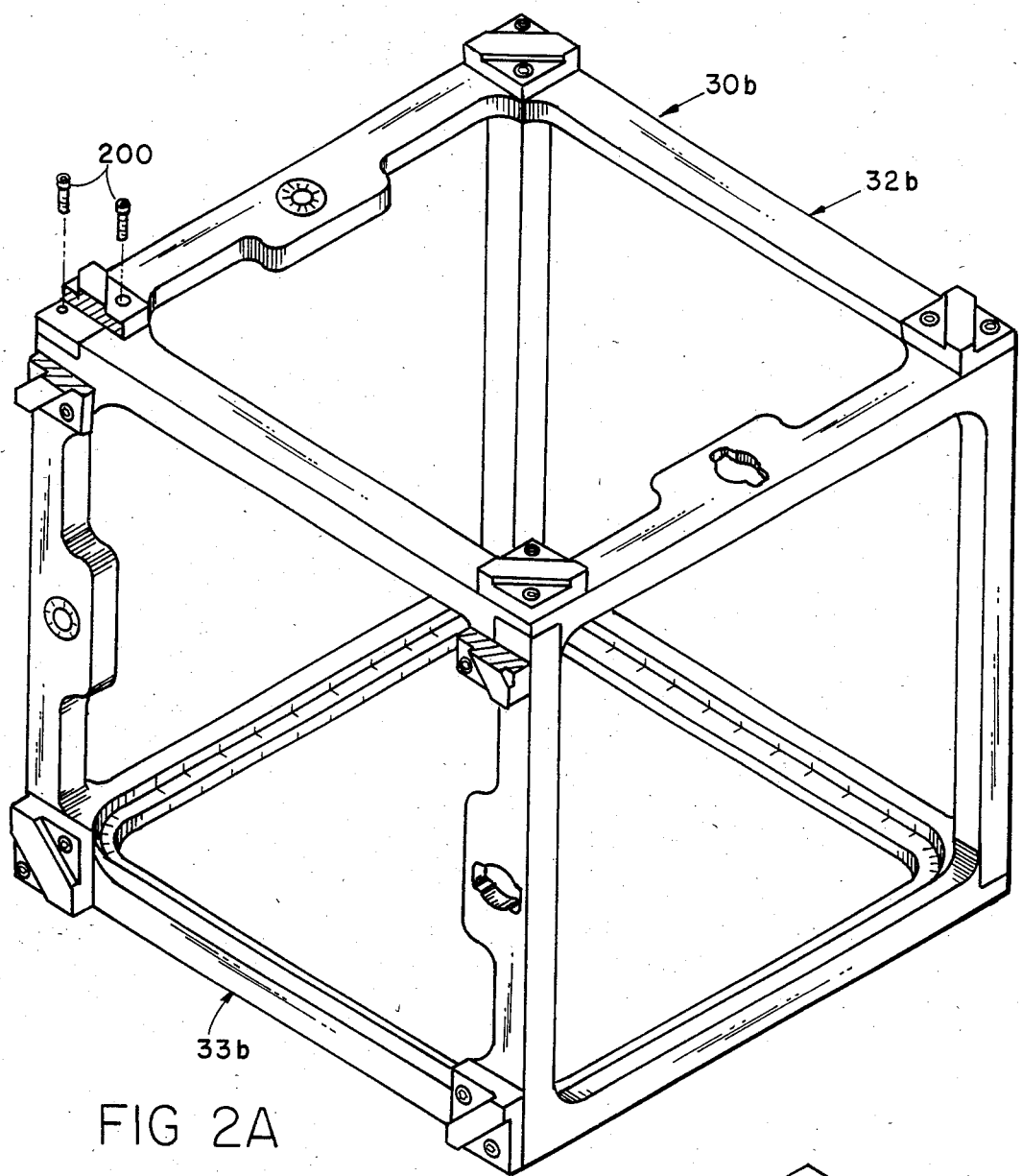
FIG. 2A is an oblique view of a modified construction for the fixture cage of FIG. 2.
Figure 2B:
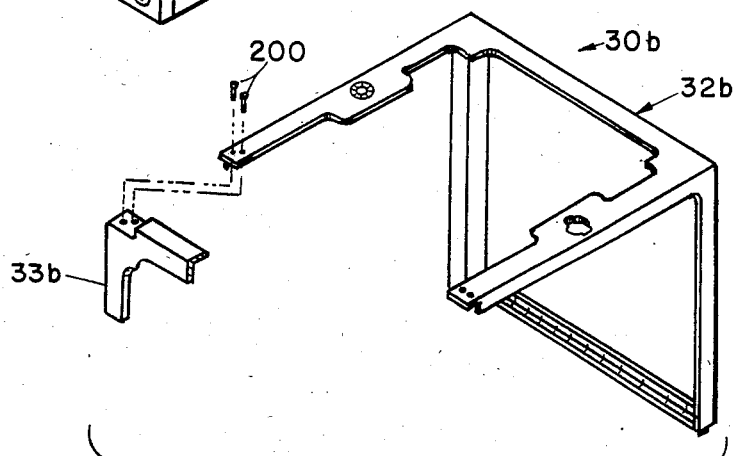
FIG. 2B is an oblique view of one of the frame sections of the fixture cage structure illustrated in FIG. 2A.

FIG. 2A illustrates the fact that figure cages 30b can be made as two L-shaped frame sections 32b and 33b which can be assembled at four diagonally located corners and joined by stud bolts 200. At those corners where a locating pad is mounted, the anchor bolts for the locator pads can also serve as the connecting studs for the frame sections 32b and 33b.

Figure 7:
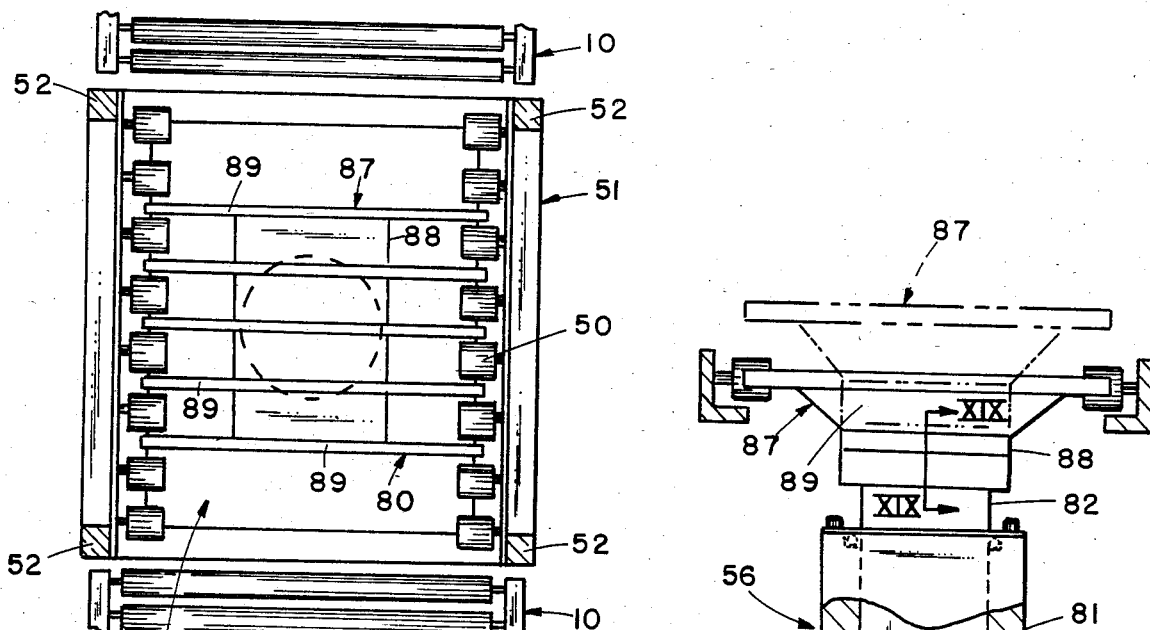
FIG. 7 is a sectional view of the cell taken along the plane VII—VII of FIG. 6 and omitting the fixture cage.

The fixture cages are moved through the system by the conveyor 10. The conveyor can be any one of a number of conventional designs such as a power driven roller conveyor or an accumulator conveyor. The conveyor is not described in detail because it is conventional in design and the engineering details of its construction are not relevant to this invention. At each work station 13 a cell 14 (FIG. 6) is provided for rigidly holding and locating the fixture cage 30 in exact alignment with the tool or tools at that station. The conveyor normally terminates on each side of a cell with special cage supports 50 being provided within the cell so the fixture cages can be moved into and out of the cell (FIG. 7). If the cell is a dual unit such as at station 13, for example, (FIG. 1), the cell has the capacity to simultaneously handle two of the fixture cages. Each unit of a dual unit cell has the same function and structure as a single unit cell. Therefore, a single unit cell will be described, it being understood that it is duplicated in a dual unit cell.

Figure 6:
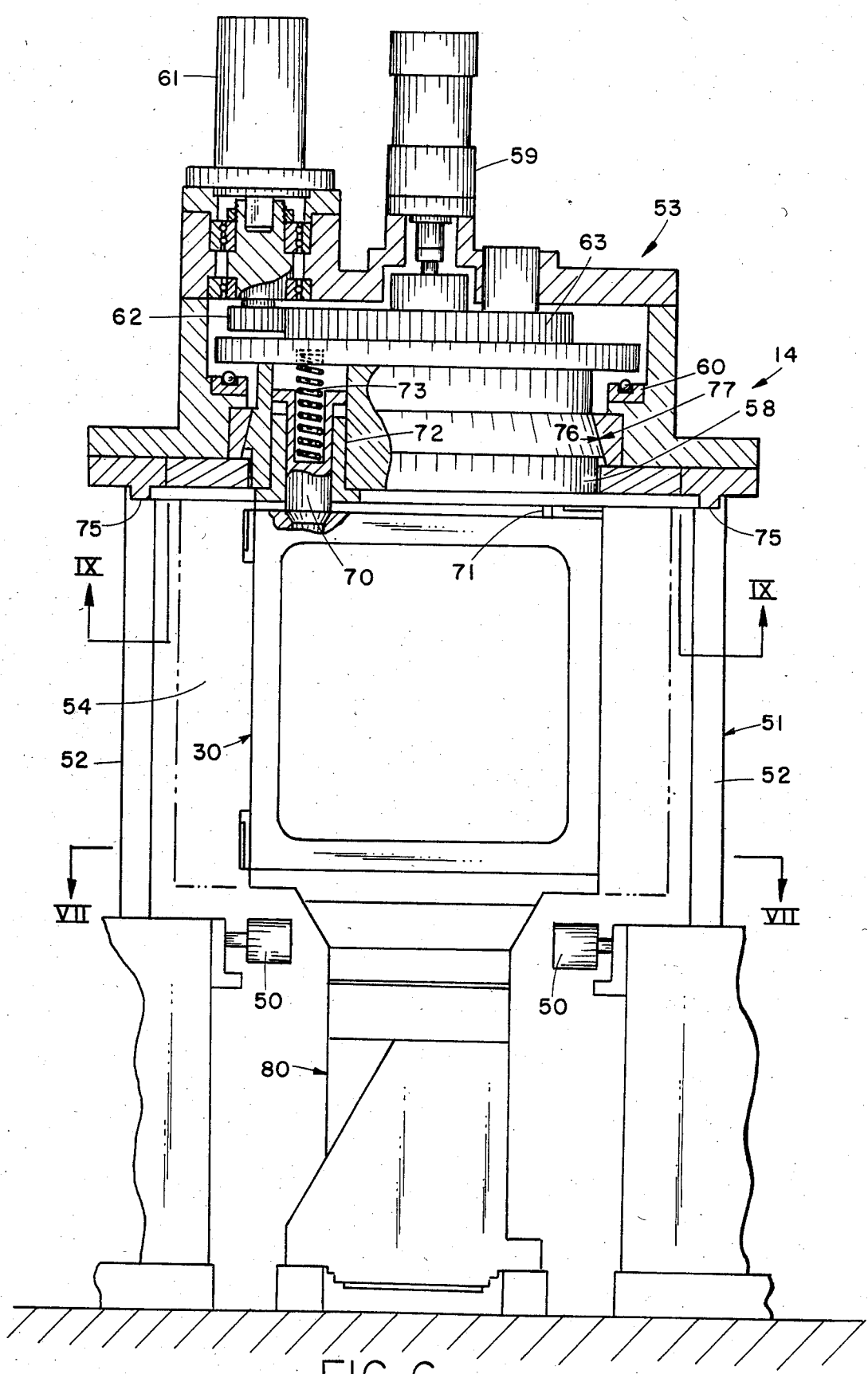
FIG. 6 is a sectional view of the holding and locating cell for a fixture cage.
Figure 9:
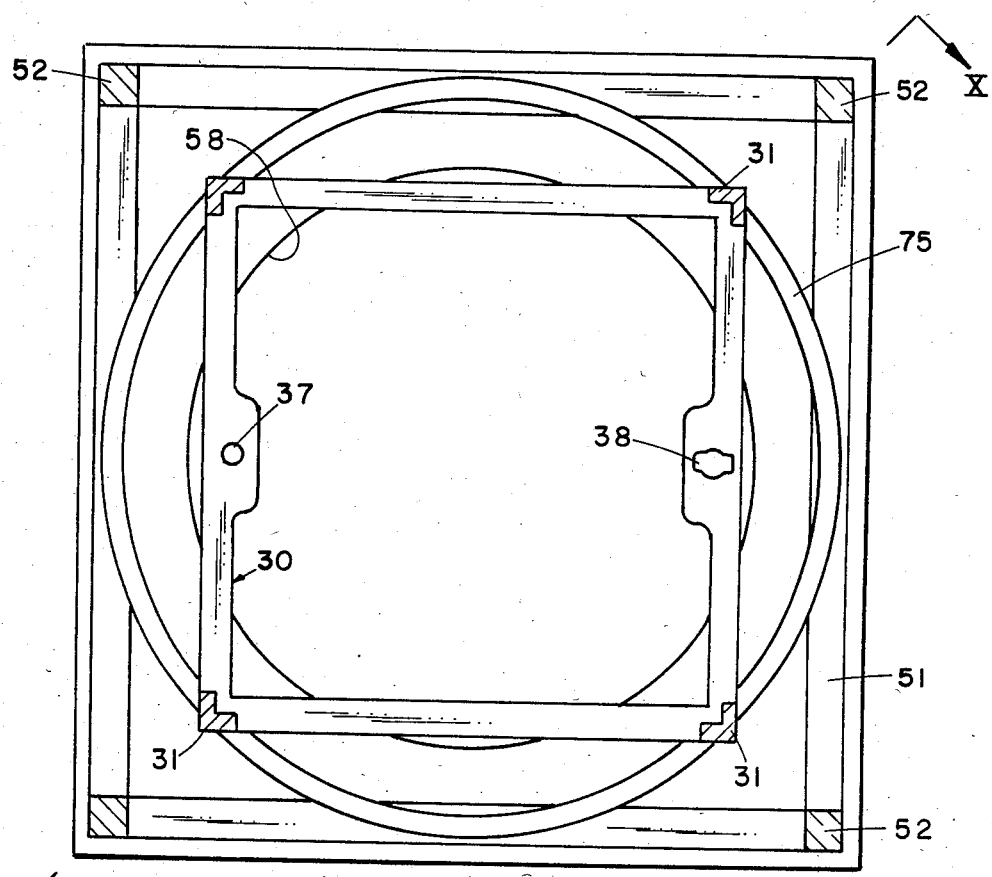
FIG. 9 is a sectional view of the top of the cell taken along the plane IX—IX of FIG. 6.
Figure 10:
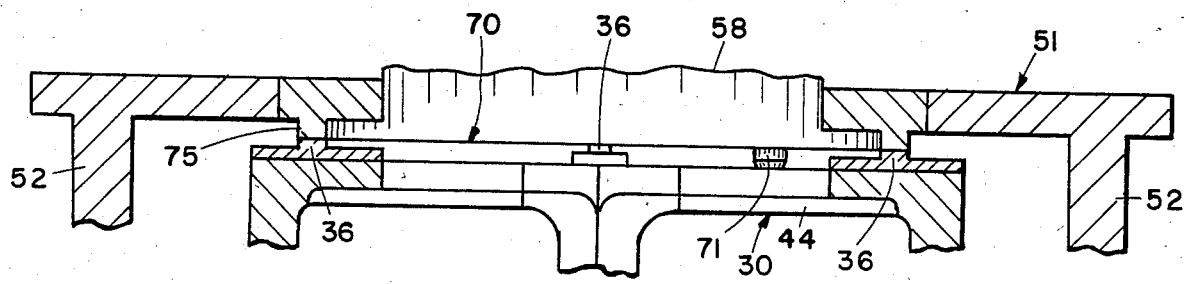
FIG. 10 is a fragmentary sectional view of the fixture cage and cell taken along the plane X—X of FIG. 9.

Each cell 14 has a rigid registry frame 51 including four corner columns 52 supporting a registry actuator unit 53 (FIGS. 6 and 9). The registry actuator unit is supported at the top of the columns 52, creating an internal fixture chamber 54 which, preferably, has a pair of opposite open faces centered about an axis normal to the conveyor to provide tool access. Its other two faces preferably are also open to provide entry and exit ports for the fixture cages. However, this is not essential because the fixtures may be moved in and out through a single open face opposite the tool or an open face at a right angle to the tool. At each cell the fixture cages 30 leave the conveyor on entering the cell and are supported by suitable low friction means such as a pair of tracks equipped with conveyor wheels 50 (FIG. 7). This arrangement leaves the entire center portion of the lower face of the fixture unobstructed. Suitable means are provided to substantially center the fixture cage 30 in the cell 14. Conventional sensor means can be used for this purpose. When the fixture cage is properly positioned within the cell, a lift 80 is actuated to lift the fixture cage free of the wheels 50 and press its indexing pads 36 against an annular locator ring 75 at the top of the fixture chamber 54 (FIGS. 6 and 9).

Within the registry frame 51 is a registry plate 58 rotatably secured to the hydraulic ram 59 (FIG. 6). The registry plate is supported on a circular bearing track 60. The track consists of a ring of ball bearings to provide low friction, accurate support for the registry plate. The track 60 is accurately machined and located so that the plate positively maintains a horizontal lower surface as it rotates. Rotation of the plate is effected by a prime mover 61 operating through the spur gear 62 meshed with the ring gear 63. The spur gear 62 is vertically spaced from the registry plate sufficiently to allow vertical movement of the plate and ring gear 62 without interference.

Projecting through the lower face of the registry plate are a pair of locator pins 70 and 71. Only the locator pin 70 is illustrated in detail. However, the construction of both pins is identical. The lower ends of the pins are frusto-conically shaped and are lapped to a precise size to eliminate all clearance with the locator openings 37 and 38 of a fixture cage. The locator pins 70 and 71 are supported in bushings 72. The bushings are accurately located in the registry plate and have a close tolerance fit with the locator pins because these pins control the accuracy of location of the fixture cage about the vertical axis of the cell. The locator pins are each biased into extended position by a spring 73 and their downward vertical travel limited by a head 74.

The header plate 66 of the registry frame 51 surrounding the registry plate 58 is stationary and on its lower surface has a locator ring 75. The lower surface of the locator ring is offset slightly below the lower surface of both the registry plate and the registry frame and is accurately machined to a surface which at all points is horizontal and is in a plane parallel to a horizontal plane passing through the geometric center of a fixture cage 30 when the latter is locked into position in the cell. The locator ring 75 is of a diameter to engage the locating pads 36 or 36a on the fixture cage and, along with the locator pins 70 and 71, controls the accuracy with which the workpiece is located with respect to the tool or tools 68 adjacent the cell at a work station.

Figure 18:
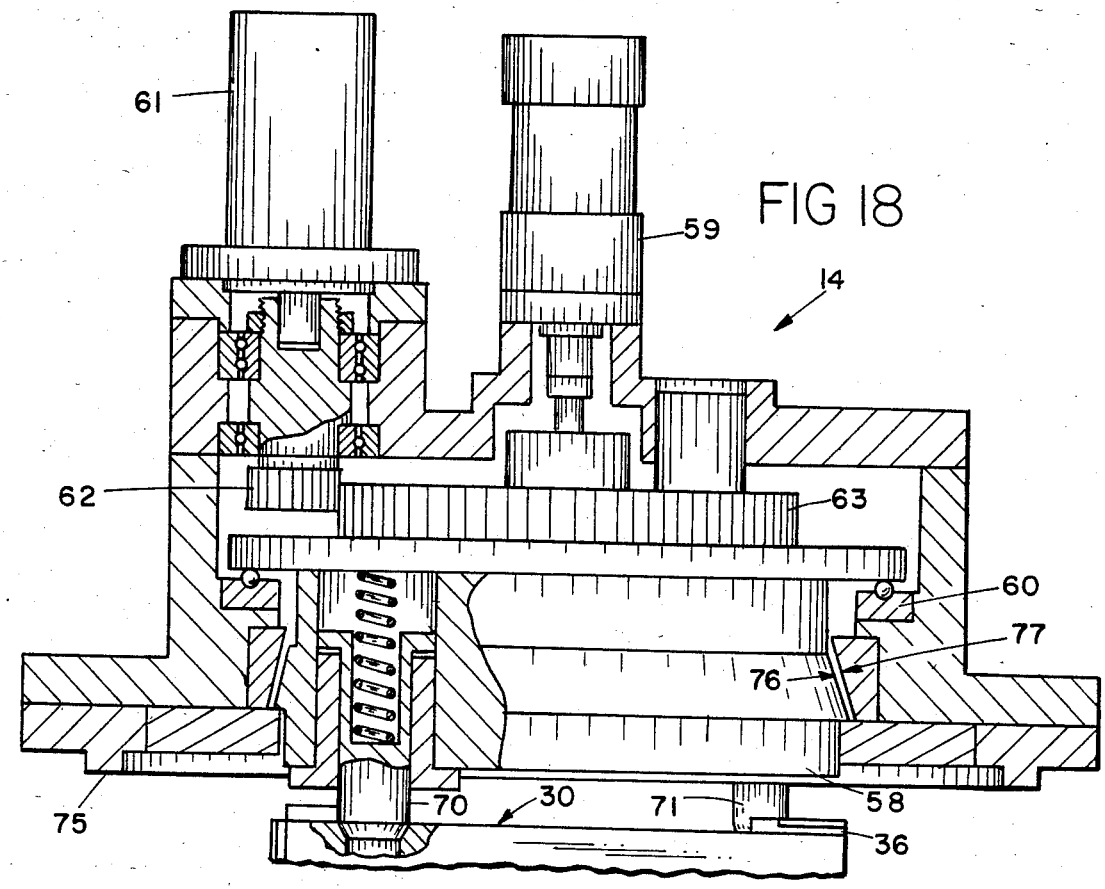
FIG. 18 is an enlarged fragmentary view of a portion of the registry frame and registry head of one of the cells.

The fixture cage 30, as illustrated in FIG. 6, is in raised position with its locating pads 36 pressed tightly against the locator ring 75 by the lift assembly 80. This in turn lifts the registry plate 58 off the track 60 against the resistance of the ram 59. At the same time it presses the frusto-conical periphery 76 of the registry plate against the matching wall 77 of the registry plate opening in the top of the registry frame 51. These mating tapers positively locate and find the actual centerline of the fixture cage when the latter is locked into position for machining the workpiece. This centerline passes through the primary reference point, the geometric center of the fixture cage. The object of this construction is to be able to align the tools at each machining station with the fixture cage's geometric center within very few ten thousandths of an inch every time. When the fixture cage is to be rotated about its vertical Z axis the lift assembly is retracted enough to seat the registry plate on the track 60 and disengage the locating pads 36 from the locator ring 75 (FIG. 18). At the same time this disengages the registry plate from the wall 77. In this position the locator pins 70 and 71 remain engaged with the fixture cage. Rotation is effected by actuation of the prime mover 61.

Below the cell's internal chamber 54 is a lift assembly 80 (FIG. 8) for raising the fixture cage 30 from its supports 50 and raising it into engagement with the locator pins 70 and 71 and the locator ring 75. The lift assembly has housing 81 with a vertical ram 82 which is raised and lowered by the piston of an hydraulic cylinder 83. The piston has a cam 84 block engaging a cam slot 85 in the ram to raise and lower the ram. The retracted position of the lowered cam and slot are illustrated in solid lines and in broken lines in extended or raised position. A second or locking cylinder 86 operates a wedge lock 86a to hold the ram in raised position by retracting the lock. This arrangement assures positive retention of the vertical position of the fixture cage during machining. Any of a number of conventional means can be provided to assure proper sequential operation of the actuator and locking cylinders 83 and 86 so that the operation of one will not interfere with that of the other. A fixture engaging header assembly 87 is rotatably mounted at the top of the ram whereby a fixture cage can be rotated without rotating the ram.

The design of the head will depend in part on the design of the fixture cage.

Figure 8:
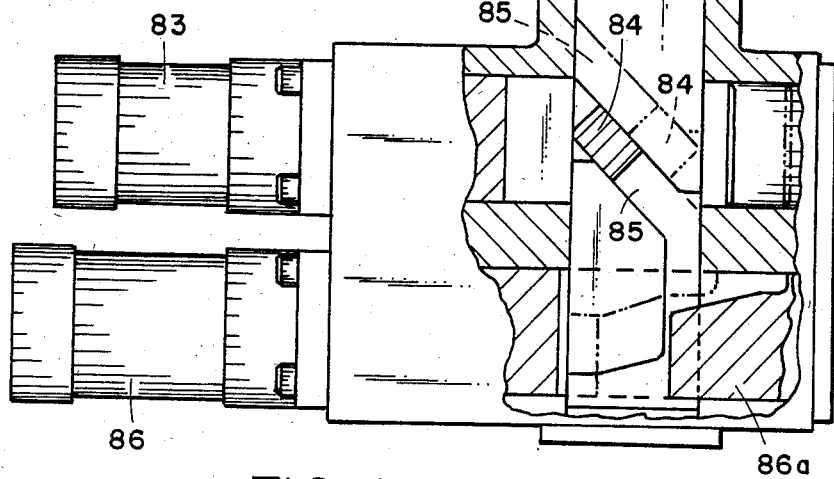
FIG. 8 is a partially sectional view of the fixture cage lift and clamp at the work station.

In its simplest form the header assembly is a circular plate which will engage the center of the bottom of a fixture cage. However, if it is desired to keep the normally bottom face of the fixture cage as open as possible, this header design cannot be used because the fixture cage will have no structure at the center of its bottom face to be engaged by the head of the ram. Thus, if tool access through the bottom face is the objective, the head has to be designed to engage the perimetrical frame of the fixture cage. This involves a more complex construction than if a portion of the fixture cage's bottom face can be obstructed by a cross bar structure. A head structure suitable to maintain an open bottom face is illustrated in FIGS. 7 and 8. The head 87 is rotatably mounted on the end of the ram 82 and has a plate 88 which mounts a plurality of upstanding panels 89. The height of the panels is such that their tops are just below the tops of the fixture cage supports 50 and thus do not interfere with the movement of the fixture cages through the chamber 54. The panels are spaced to interfit between the supports 50 when the ram 82 is retracted. The outer ends of the panels are above the supports 50 (as shown in phantom in FIG. 8) when the ram is raised sufficiently to lift the fixture cage from the supports but before the fixture cage indexing pads 36 engage the locator ring 75. For this purpose the outer ends of the panels are cut away to clear the supports 50 as the head is turned.

Figure 19:
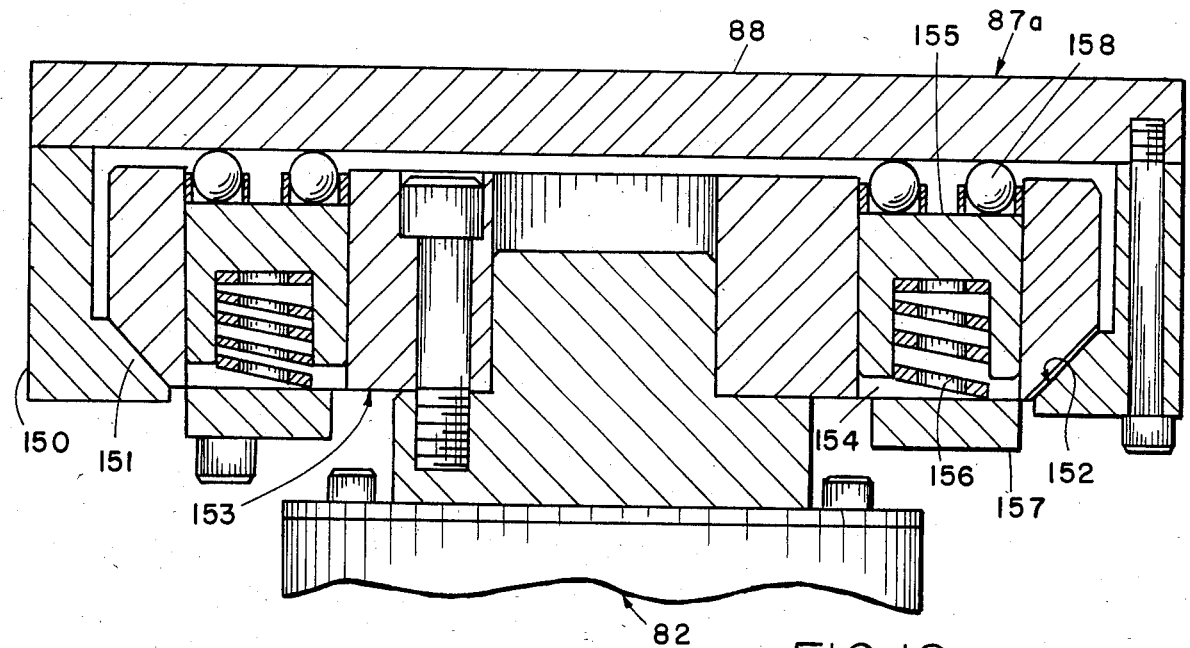
FIG. 19 is a fragmentary sectional view taken along the plane XIX—XIX of FIG. 8.

Whether the fixture engaging part of the header assembly is simply a circular plate or the assembly illustrated in FIG. 8, the same mechanism is used to permit rotation without rotation of the ram. This mechanism is illustrated in FIG. 19. In this construction the top plate 88 of the head 87a has a dependent skirt 150 with an in turned lower lip 151 which engages the lower surface 152 of the inner head plate 153. The inner head plate is secured to the top of the ram 82. The inner head plate has a plurality of sockets 154 arranged in a circle. Within each socket is a plunger 155 supported for vertical reciprocal movement by a spring 156. The lower ends of the springs are seated on the retainer ring 157. The upper face of each plunger is ball sockets to seat the ball bearings 158. The strength of the springs 156 is such that the weight of the fixture cage and its part will not compress the springs to disengage the lip 151 from the surface 152 to free the plate 88 for rotation. However, when the ram 82 is raised and the registry plate 58 lowered, the lip 151 and surface 152 will release permitting plate 88 to rotate.

When the head construction utilizes the panels 89 illustrated in FIG. 8, to prevent the head being lowered without proper positioning of the panels 89 to pass between the supports 50, a panel position sensor could be added to the head which will cause the prime mover 61 to rotate the cage fixture and panels to a proper position for the panels to pass downwardly between the supports 50.

The fixture cage construction illustrated in FIG. 2 provides a fixture cage 30 with six open window faces 34. The bosses for the locator openings 37 and 38 extend into the window area only a very short distance and therefore do not materially restrict tool accessibility of the windows 34 into which they protrude. The bosses are wide enough to accommodate the locator openings 37 and 38 without weakening the structure of the fixture cage.

How and by what means a part is to be located in and secured to fixture cage depends on the design of the part, the number and type of the operations to be performed on it and the most efficient sequence for their performance. The ideal situation is when it is possible to so mount the part that every machining operation utilizing rotary tools can be performed on the part without it being relocated from one fixture cage to another or repositioned within the same fixture cage. A fixture cage having six accessibility windows 34 is conducive to accomplishing this objective. Simple parts will be relatively easy while complex parts will require substantial study and imaginative design. Computerization of the characteristics of the fixture cages and the limits of accessibility will materially facilitate this undertaking. Among the factors which have to be taken into consideration is whether restricted access at the top and bottom of the fixture cage, due to use of bottom cross bars for engaging the ram, and the upper cross bars for the locator openings 37 and 38, can be tolerated.

FIGS. 10–17 illustrate the actual mounting of a complex part of workpiece 100 within a fixture cage 30 of the type appearing in FIG. 2. The arrangement permits all of the many machining operations necessary to complete the part to be performed on the part without the part being removed from or relocated within the fixture cage. Thus, once the part is locked into position and its position accurately established with respect to the geometric center of the fixture cage, all of the machining can be indexed to a single, fixed reference point, eliminating or substantially eliminating tolerance accumulation whether all the machining is performed at one station or sequentially at several stations.

Figure 13:
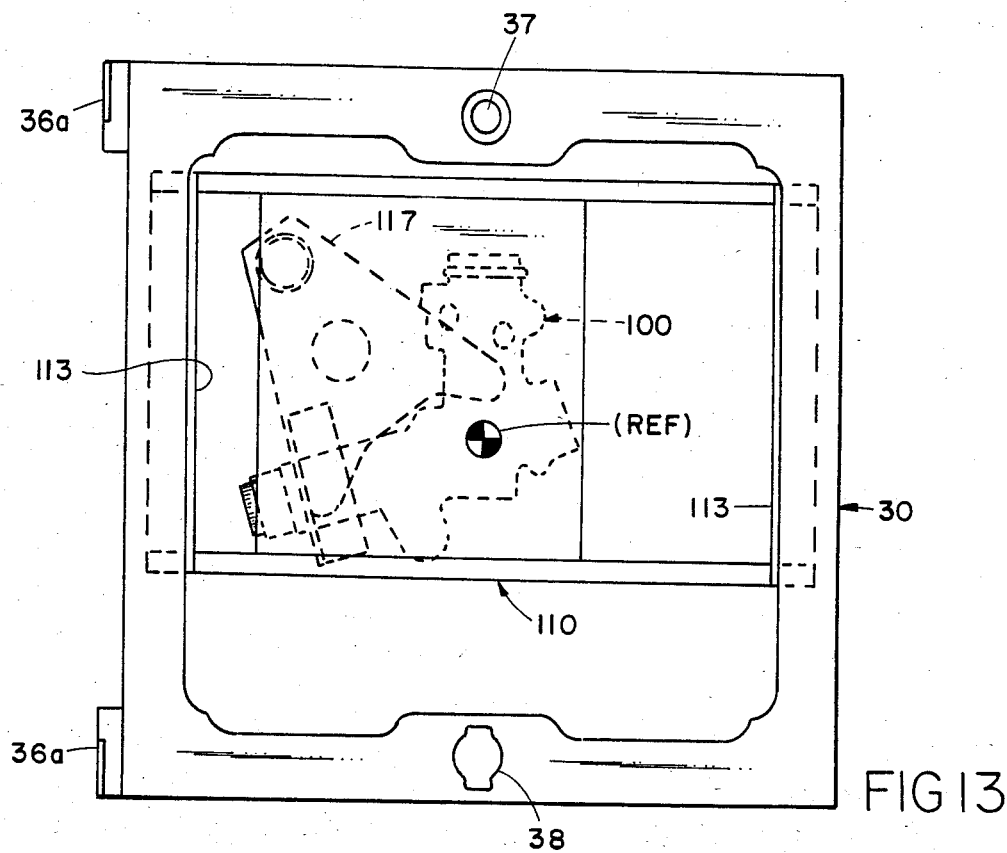
FIG. 13 is a bottom view of a fixture cage with a workpiece mounted in it.
Figure 14:
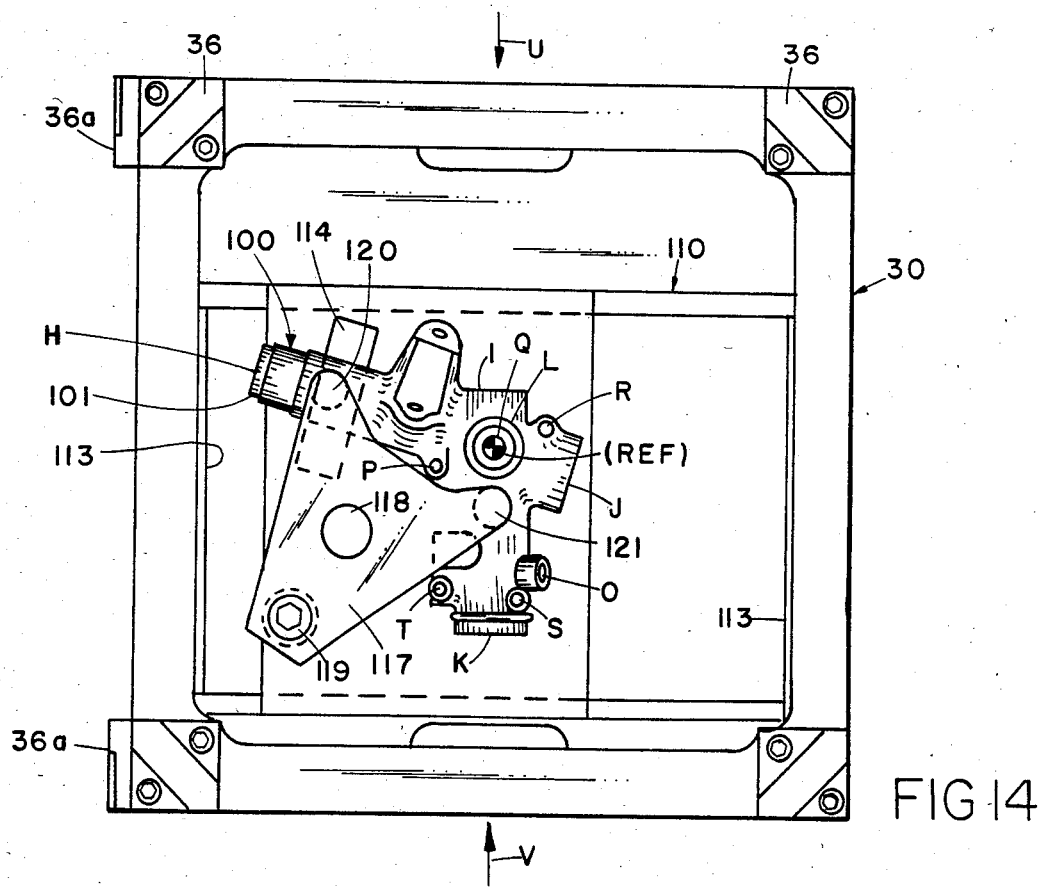
FIG. 14 is a top view of the fixture cage and workpiece shown in FIG. 13.
Figure 15:
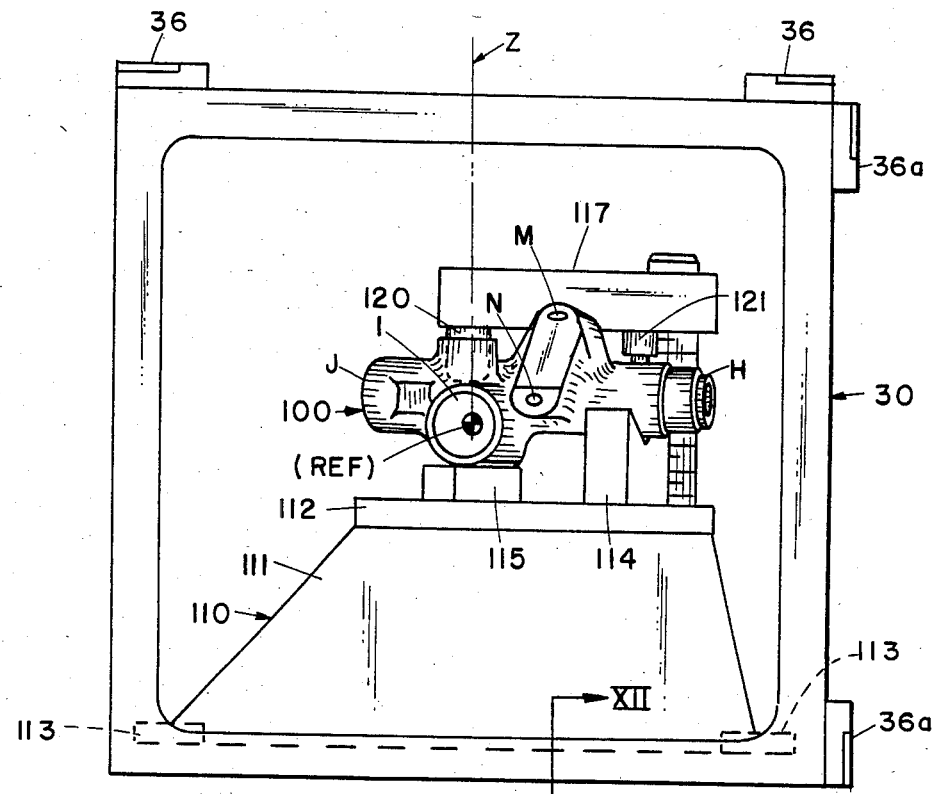
FIG. 15 is a side view of the fixture cage and workpiece taken in the direction of the arrow U in FIG. 14.

The several points at which machining is necessary are referred to in this description as targets. As seen in FIG. 13, there are five large targets H, I, J, K and L. Of these, H and J and I and K can be machined from opposite faces of the fixture cage. This machining could be done simultaneously from opposite faces, if the work station is equipped with tooling on two opposite sides of the cell as shown in stations 13–13b in FIG. 1. Alternately H and J can be machined sequentially by rotation of the fixture cage about its Z axis. The machining could include internal boring, reaming and/or threading as well as milling of the faces perpendicular to the axis of the openings. In the case of target H, the exterior face 101 of the workpiece could be machined to an accurate diameter and the step 102 cut at the end (FIG. 14).

The clamping mechanisms employed within the fixture cage will normally require custom design and location since the configuration of the part will govern their location and construction. Therefore, the clamping devices shown in FIGS. 10–17 are only exemplary. In the case of the part 100 the part is supported on a base 110. The base in this case consists of a pair of generally trapezoidal plates 111 to which is welded a flat platform 112 for seating the part. The ends of the plates are welded to anchor strips 113 which in turn seat in the recesses 44 on opposite sides of the fixture cage. These anchor strips are secured to the flanges 45 of the recesses by suitable means such as cap screws or welding. The ends of the base can be left open to reduce weight so long as doing so does not reduce rigidity because it is vitally important that the base be rigid irrespective of the amount of tool pressure and the direction of its application imposed on the part during machining. Mounted on the base are a cradle 114 and support posts 115 for supporting the part 100 at appropriate locations. The height of the posts and the saddle, preferably, is such as to center the part about the geometric center (REF.) of the fixture cage to facilitate indexing the part to the tools at the station or stations where machining is to be done. Additional support members or parts could be added as required by the shape of the part. In the case of the part illustrated in FIGS. 13-17, the part requires access from only five faces rather than six. Therefore, the base 110 could obstruct one face, in this case, the bottom face of the fixture. Other part designs may require access on all faces or only two or three of the faces or windows 34.

To hold the part firmly against the cradle 114 and the support posts 115, a clamp 116 is provided. Again at least portions of the clamp will be custom designed to accommodate the part. In the construction illustrated, the clamp has a plate 117 fulcrumed on an adjustable pin 118 and rocked into clamping position by the bolt 119. The plate has suitable part engaging fingers 120 and 121 designed to accommodate the part's configuration. The clamp forces the part tightly against the base. In designing the support and clamps for the part, it is very important that the part be accurately positioned in a precisely predetermined position with respect to the geometric center R of the fixture cage because this is the master reference for positioning the tools to be used for the machining. It need not be centered on it but it must be indexed to it. It is also very important that the base and clamps positively hold the part against any type of movement or deflection due to tool pressure exerted against the part during machining. While time, care and skill must be invested in the design, location and mounting of the part of each design. This eliminates the time consuming and error prone task of repeatedly remounting the part in several fixtures in order to complete the machining.

In the case of a part requiring machining from only two faces oriented 90° to each other, the part can be located adjacent the two faces to reduce tool travel. Even though this is done, the controlling reference point remains the geometric center R of the fixture cage.

Figure 16:
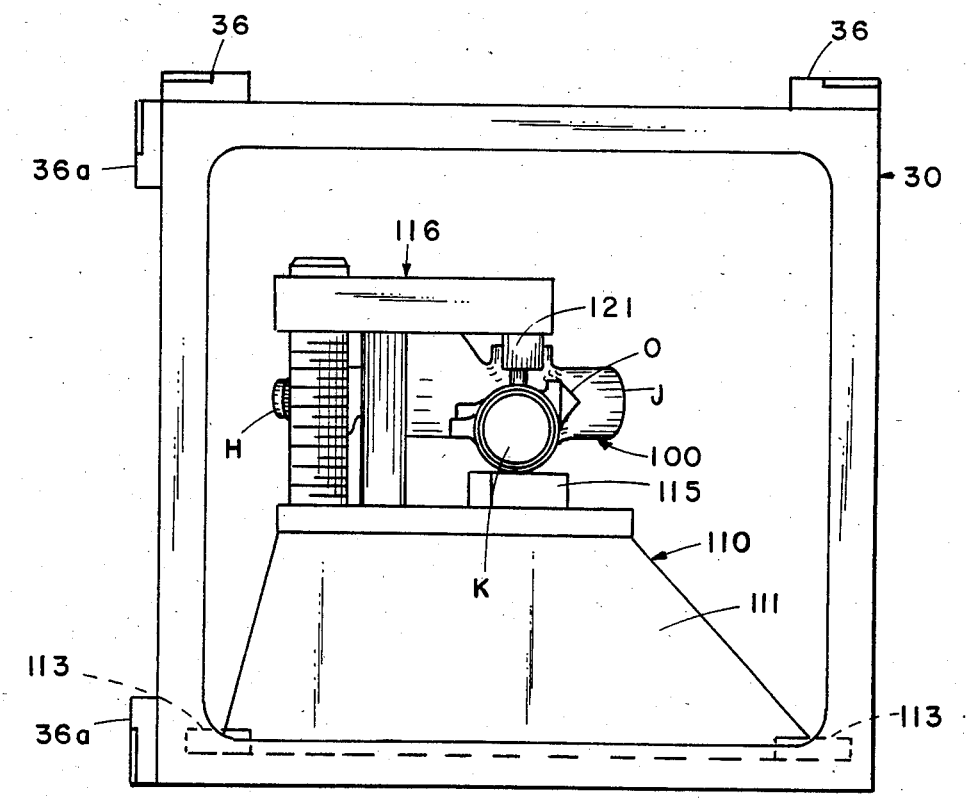
FIG. 16 is a side view of the fixture cage and workpiece taken in the direction of the arrow V in FIG. 14.
Figure 17:
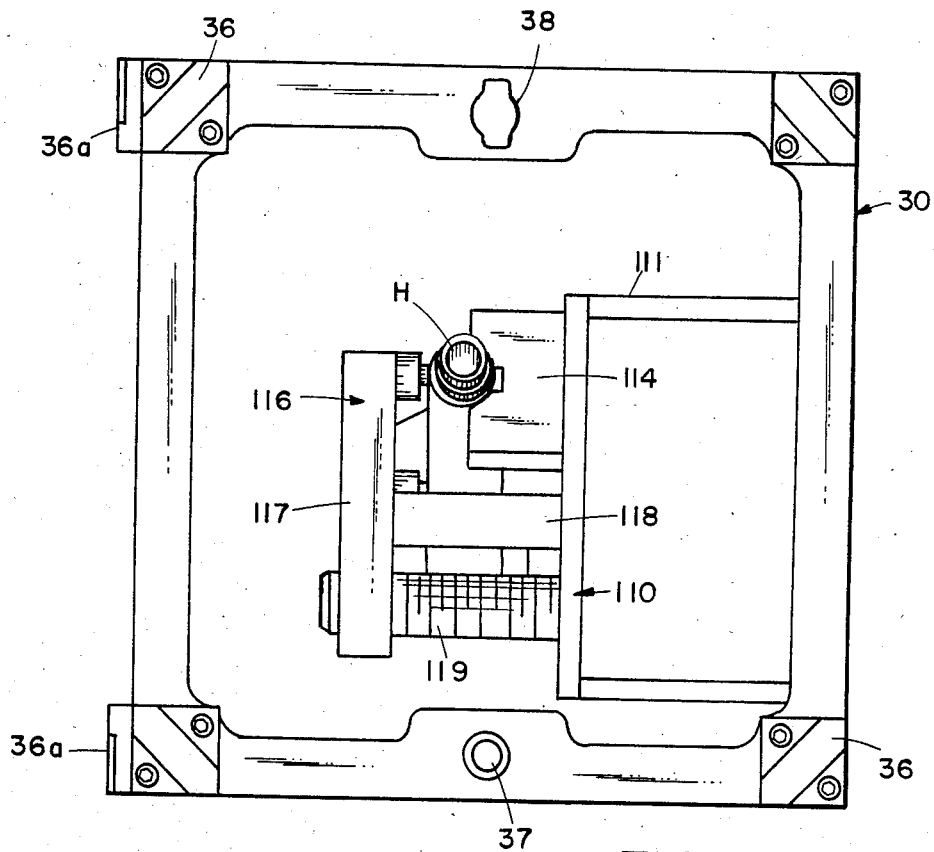
FIG. 17 is a side view of the fixture cage and workpiece after the fixture cage has been rolled over 90° so the top becomes a side.

The following is an illustrative procedure for machining the part 100. However, the procedure could be varied widely. Considering first FIG. 15, in this position target I could be machined. If the station was also equipped with tools mounted at the proper angle, targets M and N could be machined. It is more likely that M and N would be machined at a subsequent station. By rotating the fixture cage about its vertical Z axis about 75°, the target H will be positioned for machining. Then rotating the fixture cage approximately an additional 105°, the target K will be positioned for machining (FIG. 16). Upon a further rotation of approximately 75°, the target J will be positioned for machining.

When all targets available as a result of part rotation about the Z axis have been completed, the fixture cage will be moved out of the station, placed on a roll over or inversion unit in the conveyor so that what was the bottom face is positioned vertically (FIG. 14) and returned to the same station or advanced to another station. In this position the targets P, Q, R, S and T can be machined. Also, by rotation of the fixture cage about the then vertical axis, the target O can be machined. All of this can be done because for each station and each tool the controlling reference point is the geometric center (REF.) of the fixture cage. It can be seen that very complex machining can be accomplished on a workpiece without the necessity of disturbing its position in relation to the reference index which controls the accuracy of the machining. It will also be recognized that had there been a target on the bottom side as seen in FIG. 13, it might have been possible to provide access by means of a suitable opening through the plate 112.

A very important facet of the invention is that the fixture cages are of universal design and are reuseable. Even though the base and clamp structure used for a particular part has to be discarded, this is a matter of minor cost compared with the cost of conventional, customized work support jigs which must be scrapped in their entirety when the production run of the particular part is complete. In a modified construction of the fixture cages the corner posts 31 and the top and bottom frames 32 and 33 can be bolted together. After detaching and discarding those of the components to which the equivalent of the base 110 has been welded the discarded components can be replaced with standard components since all of the fixtures are structurally identical. Thus, adaptability of the fixture cages from one part to another is minimal in cost.

The system can be designed to accommodate the machining of a number of different parts simultaneously. This is done by passing some parts through certain work stations without performing any work on them. Another arrangement would be to provide by-pass conveyor lines permitting certain parts to by-pass stations at which nothing is to be performed on the parts. This eliminates the problem of the more complex, time consuming parts controlling the production rate of parts requiring less machining time. For example, the secondary conveyor line 140 illustrated in broken lines in FIG. 1 illustrates an arrangement by which parts can be routed through the system while by-passing a number of stations. For example, a part could be routed directly to station 13m using the secondary line 140. It could also be caused to by-pass stations 13d-13k after passing station 13c. Parts could also be subjected to special machining on the parallel by-pass conveyor 140a.

Figure 20:
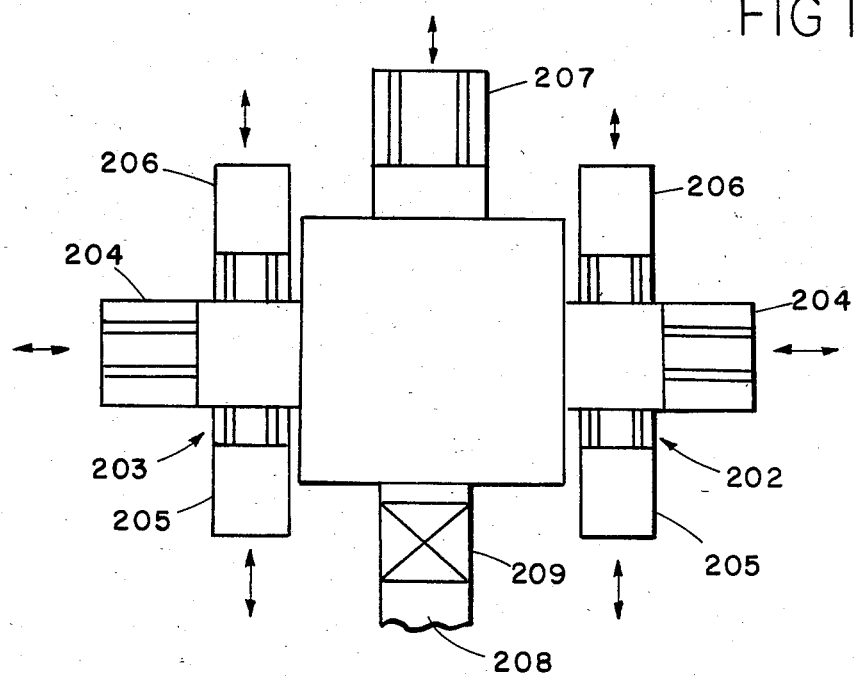
FIG. 20 is a schematic view of a three-way machining station utilizing this invention.

The fixture cage of this invention can be used with a machining center 200 as well as the system illustrated in FIG. 1. Such a center is schematically illustrated in FIG. 20. The core of the center is a cell 201 of the same construction as that illustrated in FIGS. 6 and 18 in which the fixture cage is precisely located and indexed to the tools using its geometric center as a reference point. Such a machining center can be equipped with a variety of tools such as the triple machines 202 and 203 each of which have a tool 204 which moves toward and away from the cell and a pair of laterally movable tools 205 and 206 which can alternately move into operating position when the tool 204 is retracted. A third side of the cell is equipped with another machine 207. The fixture cage is loaded into and removed from the cell 201 through the fourth side by any suitable means such as a conveyor 208. To maximize utilization of the machining center's capabilities a roll-over 209 can be provided at the entrance to the cell. Because the construction of the fixture cage provides five or six tool access windows, all of the machining on a complex part can be performed at a single station, resulting in a completed part at the end of each cycle. The arrangement provides maximum control of tolerance accumulation, dependable, repeatable identity of the parts produced and has the flexibility of requiring minimum changeover labor and downtime to retool the center for parts of different designs.

The movement of the fixture cages through the system can be entirely computer controlled including selection of the stations at which work is to be performed, passing through or by-passing certain stations. The computer can control all of the steps to be performed at each station including which tools are to be used the sequential rotational movement of the fixture cage and whether the fixture cage is to be turned on its side.

The invention provides an integrated system for machining capable of a high degree of repeatable accuracy. It also provides a system having greatly reduced changeover costs and minimal changeover down time. In fact, in a system such as illustrated in FIG. 1, some of the work stations can be deactivated for retooling for different parts while the remainder of the system continues to operate. This is possible because the fixture cages in size and shape are always identical for every part. Thus, so far as the system is concerned, the only adaption needed from one part to another is changing and repositioning the tools. Where the system is fully automated and computer controlled, the computer program has to be modified but only to the extent of reprogramming the necessary portions. All of the time consuming tasks of preparing the fixture cages and testing the part position for accuracy can be and normally is performed in work areas remote from the system itself.

A preferred embodiment of the invention has been described. It will be recognized that various modifications of the invention can be made without departing from the principles of the invention. Such modifications are to be considered as included in the hereinafter appended claims, unless these claims by their language expressly state otherwise.

We claim:

1. A fixture cage for supporting a workpiece during machining, said fixture cage being cubical in shape and having a bottom peripheral frame and a top peripheral frame and interconnecting posts at all four corners, said frames and posts forming a rigid inflexible structure; locator means adjacent each of the corners on two adjacent faces of the fixture cage, each of which faces being centered about a different axis of the fixture cage, said locator means having surfaces equally spaced from the geometric center of the fixture cage, indexing means on each of the same faces as said locator means; said indexing means each being centered about one of the axes of the cage passing through the cage's geometric center; workpiece supports within the fixture cage for holding a workpiece in a stationary position within the fixture at a predetermined and fixed position with respect to the geometric center of the fixture.

2. Means for machining workpieces including a station and a rigid inflexible cubical fixture cage for holding a workpiece within said fixture cage in a predetermined and fixed position with respect to the geometric center of the fixture cage, said fixture cage having locator means adjacent each of the corners of two adjacent faces and spaced an equal and precise distance from said geometric center; a pair of indexing means on each of the same faces, each of said pairs being centered about one of the axes of the cage passing through the cage's geometric center; said station having a fixture supporting cell, the cell having a stationary frame defining an internal chamber of a size and shape to receive a fixture cage, at least one side of the chamber being open to provide access for machine tools, another side being open and through which the fixture cage can be entered and removed; a stationary index member at the top of the cell having an accurately located lower surface serving as a vertical reference for the machine tools at the station; means within the cell for lifting a fixture cage and pressing and holding the locator means of one face of the fixture cage against said lower surface of said index member, a pair of locator elements depending from the top of said chamber for engaging said indexing means of the fixture cage and accurately positioning the fixture cage about its vertical axis with reference to a vertical plane indexed to the machine tools at the station and passing through the geometric center of the fixture cage.

3. Means for machining workpieces as described in claim 2 wherein the top of said cell includes a rotatable member; said locator elements being mounted on said member; a drive member for rotating said member and control means therefor whereby said fixture cage can be rotated about its vertical axis a full 360° in segments of predetermined length to present all four sides of the workpiece to the machine tools.

4. Means for machining workpieces as described in claim 2 wherein one of said locator elements is a taper pin engaging one of a pair of said indexing means, said one indexing means being an opening in the fixture cage having a close fit with the pin and the other locator element is a conical pin engaging the other of the same pair of indexing means, said other means being a circular opening in the fixture cage into which said pin is adapted to seat and lock to the side walls thereof.

5. Means for machining workpieces as described in claim 3 wherein reorientation means are provided adjacent said station for rotating the fixture cage about its horizontal axis and reentering it into the chamber of the cell with the locator means and indexing means on the other of the adjacent faces positioned to be contacted by said cell's locator means and indexing member respectively.

6. A production line for machining workpieces, said line including a plurality of work stations interconnected by transfer means, each of the work stations having a work performing tool and an adjacent fixture supporting cell aligned with the tool, each cell having a fixture receiving chamber and a stationary indexing means at the top of the chamber precisely located vertically with respect to the tool, at least one rigid cubical fixture having tool accessibility on all its faces and having internal workpiece holders positioned to support a workpiece within it and in a predetermined and fixed position with respect to the geometric center of the fixture, said fixture having locating blocks arranged to align with said indexing means, said locating blocks having indexing means contacting surfaces precisely located with respect to the geometric center of said fixture, a lift in said cell for raising the fixture off the conveyor and pressing and holding its locating blocks against said indexing means to precisely vertically locate the geometric center of the fixture with respect to the tool, means in said cell for rotating said fixture about its vertical axis to present all faces of the fixture then parallel to said vertical axis to the work performing tool; locator elements on said rotating means and positioning means on said fixture for engaging said locator elements for precisely positioning said fixture circumferentially about its vertical axis with respect to the tool whereby a workpiece within the fixture is in all positions of the fixture precisely located both vertically and circumferentially of the geometric center of the fixture and, thus, with respect to both the cell within which it is located and the tool located at that cell.

7. The production line for machining workpieces described in claim 6 wherein there is provided a control member for said rotating means having programmable elements for determining the length of the sequential increments of rotation.

8. The production line for machining workpieces described in claim 7 wherein said programmable elements of said control member also determine the length of sequential increments of rotation when the fixture has been rotated 90° about its horizontal axis.

9. The production line for machining workpieces described in claim 6 wherein said conveyor includes by-pass lines for work stations to permit a fixture to be stopped at only selected ones of the work stations.

10. The production line for machining workpieces described in claim 9 wherein at least one station is provided in the line for rotating a fixture about its horizontal axis to present to the tool those faces of the fixture which are displaced 90° about the horizontal axis from those faces originally presented to the tool.

11. The method of locating a workpiece for machining including the steps of providing a cubical fixture cage open on at least five of its faces for mounting and transporting a workpiece, utilizing the geometric center of the fixture as a reference for locating a workpiece within said fixture, securing rigidly in place the workpiece as so located, providing the fixture with contact pads on at least two of its adjacent faces and spacing each of the pads at an identical and precise distance from the fixture's geometric center, conveying the fixture to a station in front of a tool, at the station providing downwardly directed stops precisely positioned vertically with respect to the tool, lifting the fixture and pressing it against the stops, using the vertical distance between the stops and the geometric center of the fixture as a reference for locating the workpiece and its tool target vertically with respect to the tool intermittently rotating the fixture about its vertical axis through one or more arcs of various lengths up to 360° to align additional targets on the same workpiece with the tool; rotating the fixture 90° about its horizontal axis to present upwardly the face with the other contact pads and thereby locate the fifth face in a vertical plane capable of being rotated about the then vertical axis or the fixture so that tool targets accessible through the fifth face are directed toward the tool.

12. A rigid inflexible cubical fixture cage for supporting a workpiece during machining, said fixture having tool accessibility on a plurality of its faces, a plurality of workpiece supports within and rigidly secured to said fixture cage for supporting a workpiece within the fixture and precisely positioned with respect to the geometric center of said fixture cage; stop surfaces on the exterior surface of at least two adjacent exterior faces of said fixture case which faces are centered about different axes of the fixture cage, said stop surfaces all being precisely located at the identical distance from a plane parallel to the surface on which they are located and passing through the geometric center of said fixture cage.

13. The rigid cubical fixture cage described in claim 12 wherein said fixture cage has tool accessibility on all faces.

14. The rigid cubical fixture cage described in claim 12 wherein indexing and locating means for engaging a locating element is provided on each of said two faces, said means being precisely located circumferentially about a vertical axis passing through the geometric center of the fixture cage and being coincident with a vertical plane passing through the geometric center of the fixture cage and each being parallel to one of said two faces of the fixture cage having said stop surfaces.

15. A system for machining workpieces including a plurality of stations each having a tool and at which workpieces are machined, transfer means interconnecting said work stations, a plurality of fixture cages movable along said system through designated ones of said work stations, each of said fixture cages having tool accessibility on a majority of its faces and being shaped as a rigid inflexible cube and having a plurality of workpiece supports within and rigidly secured to said fixture cage for supporting a workpiece within the fixture cage in a predetermined fixed position with respect to the geometric center of said fixture cage, locator means adjacent the corners of two adjacent faces of each fixture cage and each spaced an identical and precise distance from said geometric center; indexing means on each of two adjacent faces of the fixture cage and each located in a different plane parallel to one of the adjacent faces and passing through the geometric center of the fixture cage and coincident with one of two different axes of the fixture cage; a first engaging means on the station for engaging said locator means and second engaging means on the station for engaging said indexing means; means at each work station for positioning a fixture cage by said first and second locator means with its geometric center, both horizontally and vertically, aligned with respect to the tool at that station for locating the tool's target on the workpiece with respect to the tool.

16. A system for machining workpieces as described in claim 15 wherein the workpiece is supported substantially concentrically of the geometric center of said fixture cage.

17. The system for machining workpieces as described in claim 15 wherein means are provided at the work stations for rotating the fixture cage about its vertical axis through one or more arcs of various lengths up to 360° to align additional targets on the same workpiece with the tool.

18. The system for machining workpieces as described in claim 15 wherein means exterior of the work station are provided for rotating the fixture cage 90° about its horizontal axis and re-entering it into the work station with different ones of the locator and indexing means positioned to engage the first and second engaging means on the station.

19. The system for machining workpieces as described in claim 17 wherein means are provided exterior of the work station for rotating the fixture cage 90° about its horizontal axis and re-entering it into the work station.

20. A module for machining workpieces including a rectangular central cell and a tool operating machine arranged at one side of said central cell, a fixture cage movable into and out of said central cell through the remaining side thereof, said fixture cage having tool accessibility windows on all of its faces and being shaped as a rigid cube and having a plurality of workpiece supports within and rigidly secured to said fixture cage for supporting a workpiece in a predetermined and precisely fixed position with respect to the geometric center of said fixture cage, a plurality of stop pads on each of two adjacent faces of said fixture cage, each of said pads being precisely and equally spaced from the geometric center of said fixture cage; fixedly positioned stop elements within and at the top of said cell precisely positioned vertically with respect to said tool operating machines and arranged in a pattern to engage said stop pads, said stop elements being substantially above the plane in which machining operations are performed on the work piece; cooperating means in said cell and on both of said faces of said cell for precisely aligning a vertical reference plane passing through the geometric center of said cube with a like reference plane passing through the axis of the tool operating machine, means in said central cell for lifting the fixture cage to disassociate it from its transport means and to firmly press said top pads against said stop elements to hold the fixture cage rigidly between the stop elements and the lifting means thereby positioning said fixture cage's geometric center in a precisely predetermined vertical and horizontal position with respect to the tool operating machine, with the tool being located in a a precise position relative to both said geometric center and the tool's target on the workpiece.

21. The method of positioning a work piece for machining including the steps of providing a cubical fixture cage having at least five faces through which a tool can pass and thus make machining contact with a workpiece, using the geometric center of the fixture cage as the sole point of reference for locating a workpiece with respect to a tool, providing the work station with a fixture cage receiving cell with stop means at the top precisely positioned vertically with respect to the tool, providing the fixture cage with work station contacting means on at least two adjacent faces identically spaced from the geometric center of the fixture cage, mounting a workpiece within the fixture cage with each tool target area of the workpiece having a known vertical and horizontal spacing from the fixture cage's geometric center, placing the fixture cage in the cell adjacent a tool with the work station contacting means on one face positioned at the top of the fixture cage, raising the fixture cage and pressing its work station contact means on its then top face forcibly against the stop means, using the engagement between the stop means and work station contacting means on said one face for precisely locating the fixture cage's geometric center in alignment with a known reference point of the tool, rotating the fixture cage about its vertical axis as required to present to the tool in sequence to all of the targets accessible to the tool through the then vertical faces of the fixture cage, rotating the fixture cage about its horizontal axis to place the work station contacting means on the other face upwardly to be used to locate the fixture cage vertically, rotating the fixture cage about its new vertical axis to sequentially present all of the targets to be machined accessible through the then vertical faces of the fixture cage.

* * * * *